Dec. 14, 1937.    E. J. SWEETLAND    2,102,293
FILTER
Filed March 23, 1936
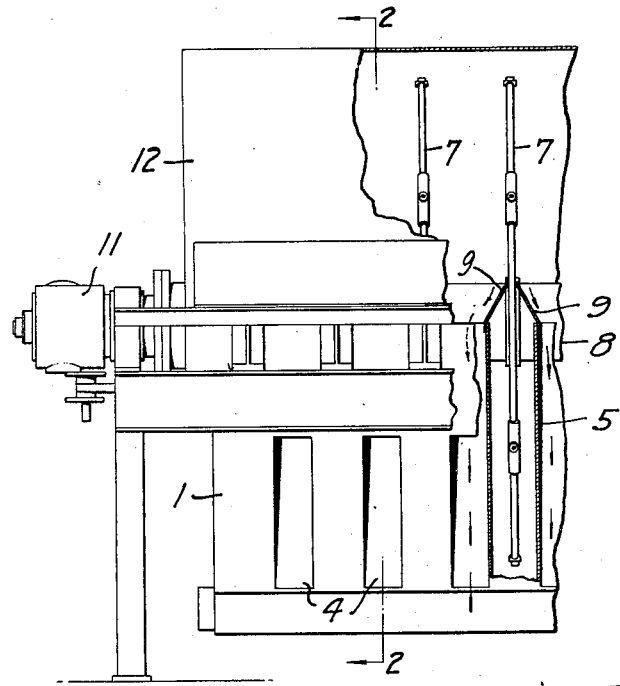
FIG_1_
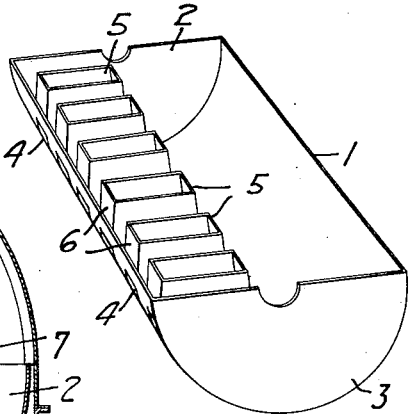
FIG_3_
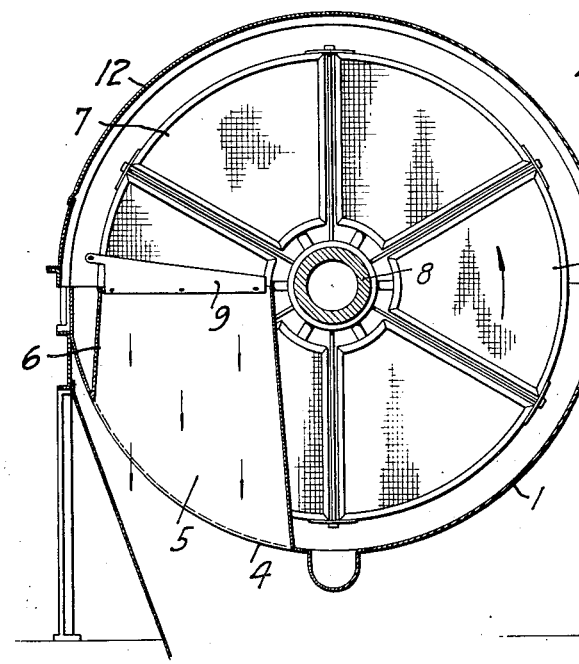
FIG_2_
INVENTOR.
Ernest J. Sweetland
BY
ATTORNEY Patented Dec. 14, 1937

2,102,293

UNITED STATES PATENT OFFICE 2,102,293

FILTER

Ernest J. Sweetland, Piedmont, Calif., assignor to Oliver United Filters Incorporated, San Francisco, Calif., a corporation of Nevada Application March 23, 1936, Serial No. 70,316

3 Claims. (Cl. 210—201)

This invention relates to continuous rotary disc filters and in particular to the construction of the pan or tank within which the discs are arranged to rotate.

"Filtration" as herein used may be considered as the separation of the liquid content and solid content of a mixture of liquids and solids, and involves the formation of what is generally known as the residue or cake and its discharge from the filter elements. Although not strictly a step of filtration, another very important function is the removal of the cake from the point of discharge.

Cake formation depends among other things upon the consistency of the slurry or pulp being filtered, upon the time during which the filter elements are in contact with the pulp or slurry, and upon the homogeneity of the slurry. The term "homogeneity" is used loosely to designate a condition of the pulp or slurry wherein its composition or consistency is substantially uniform throughout its entire volume. This characteristic depends upon the state of agitation of the slurry.

My invention is primarily concerned with a slurry or pulp tank so designed that (1) a greater circulation of the slurry is obtained than with the tanks previously known, (2) the cake may drop away from the point of discharge at least as fast as it is formed, and (3) a more rigid and less expensive structure is obtained.

In general, the object of this invention is the provision of a slurry tank or pan having a substantially continuous semicylindrical wall, in contrast to the individual pan construction of Salisbury Patent #1,259,139 of March 12, 1918 and the crenelated pan construction of Genter Patent #1,538,980 of May 26, 1925, and which is provided with a plurality of spaced openings formed along its bottom, to which are secured vertically disposed hoppers extending upwardly into the tank so that the cake formed on the discs rotating within the tank may be discharged into the hoppers and pass without obstruction through the openings in the bottom of the tank.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a side elevation of a portion of a filter embodying the object of my invention, with portions thereof broken away to show its construction more clearly.

Figure 2 is a section taken on line 2—2 of Figure 1.

Figure 3 is a perspective view showing the pan and hopper construction.

As best shown in Figure 3, the slurry tank or pan embodying the objects of my invention comprises a substantially semicylindrical wall 1, to the ends of which are welded semicircular end members 2 and 3. The semicylindrical wall 1 is provided along one side of its bottom with a plurality of rectangular openings 4, in registration with which are secured a plurality of rectangular hoppers 5 extending upwardly into the tank to the level of the upper edges of the end members 2 and 3. Preferably each of the four walls defining the hoppers 5 are vertically disposed although in some cases it may be desirable to make them downwardly divergent. From an inspection of Figures 2 and 3, it will be noted that the front walls 6 of the hoppers are spaced from the adjacent portion of the semicylindrical wall 1 defining the bottom and sides of the tank, and that therefore any pulp or slurry contained within the tank so formed is free to circulate around all sides of the hoppers.

A plurality of sectionalized filter discs 7 secured to a shaft 8 are arranged to rotate between the hoppers 5 and to the upper edges of the hoppers are secured doctors or scrapers 9, by means of which the cake is discharged from the filter discs into the hoppers. The filter discs, the shaft 8, and the automatic valve 11 associated with the shaft, may be constructed in accordance with the rotary disc filters known as the American filter as manufactured by Oliver United Filters Incorporated. When it is desired to handle volatile materials or to work in non-oxidizing or reducing atmospheres such as carbon dioxide, the filter may be provided with a hood 12 as shown in Figures 1 and 2.

It will be noted that a tank or pan constructed as above described, besides having all the advantages of the crenelated pan disclosed in the Genter patent, has the further advantage of permitting the free circulation of the pulp or slurry around the discharge hoppers 5, thereby producing a greater degree of homogeneity within the pulp or slurry than is possible with the Genter construction. By the elimination of the crenelated or indented structure utilized by Genter, and the adherence to a plain cylindrical surface, a more rigid and economical construction is obtained. In contrast with the inclined chutes of Young Patent #1,057,475 of April 1, 1913 having restricted discharge openings, the vertically disposed hoppers 5 permit a straight unobstructed drop of the cake therethrough, and by making the hoppers downwardly divergent, the tendency of the cake to adhere to its walls is diminished.

I claim:

1. A rotary disc filter comprising: a substantially semicylindrical pan; a plurality of spaced filter discs accommodated within said pan; spaced, rectangular openings formed along one side of the bottom of said pan in registration with the spaces between said discs; rectangular hoppers secured to said pan in registration with said openings and extending vertically upward between said discs; said hoppers being spaced from said discs and from the adjacent side wall of the pan; and means for discharging the cake from said discs into said hoppers.

2. A tank for rotary disc filters comprising: a substantially cylindrical pan provided along one side of its bottom with a plurality of spaced, substantially rectangular openings; and a rectangular hopper secured to each opening and extending vertically upward substantially to the top of said pan, said hoppers being spaced from each other and from the adjacent side of the pan in order to permit the circulation of slurry therebetween.

3. A rotary disc filter comprising: a filter tank; spaced openings formed in the bottom of said tank; a plurality of rotatably disposed filter discs within said tank; and downwardly divergent discharge hoppers disposed between adjacent pairs of filter discs with the upper ends of said hoppers arranged to receive residues discharged from the filter discs, the lower ends of said hoppers being sealed to the bottom of said tank in registration with said spaced openings.

ERNEST J. SWEETLAND.